Dec. 3, 1929.       J. F. O'CONNOR       1,737,613
SHOCK ABSORBER FOR VEHICLES
Filed Aug. 19, 1926

Witness
Wm. Geiger

Inventor
John F. O'Connor
By George I. Haight
Atty.

Patented Dec. 3, 1929

1,737,613

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK ABSORBER FOR VEHICLES

Application filed August 19, 1926. Serial No. 130,152.

This invention relates to improvements in shock absorbers for vehicles.

One object of the invention is to provide a simple and efficient shock absorber of compact design more particularly adapted for motor vehicles.

Another object of the invention is to provide a mechanism of the character indicated, acting in conjunction with the usual vehicle springs to absorb excessively heavy shocks to which the vehicle is subjected.

A still further object of the invention is to provide a shock absorbing mechanism for motor vehicles, and especially heavy vehicles of the bus type, wherein the shock absorbing means acts in conjunction with the usual vehicle springs and is rendered operative to absorb excessive shocks after the vehicle springs have been compressed to a predetermined extent in absorbing the lighter shocks.

A more specific object of the invention is to provide a shock absorbing means acting in conjunction with the usual vehicle springs, wherein an abutment on the body of the vehicle co-operates with the usual pneumatic tires of the vehicle wheels after the vehicle springs have been flexed to a predetermined extent to absorb the heavier shocks to which the vehicle is subjected.

Other and further objects and advantages of the invention will more fully and clearly appear from the description and claims hereinafter following.

Figure 1:
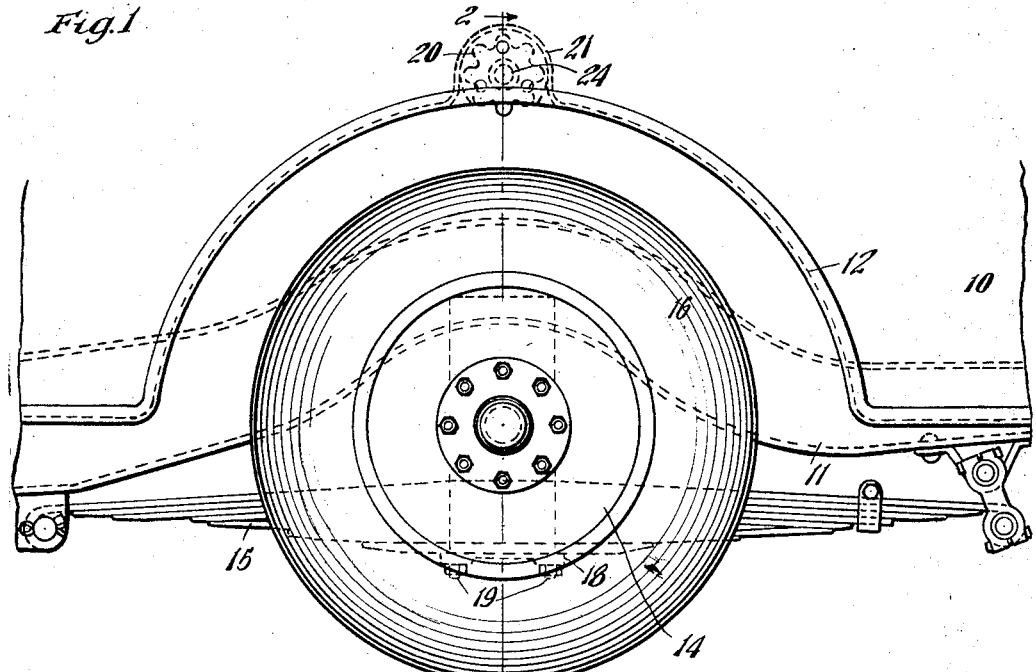
Figure 2:
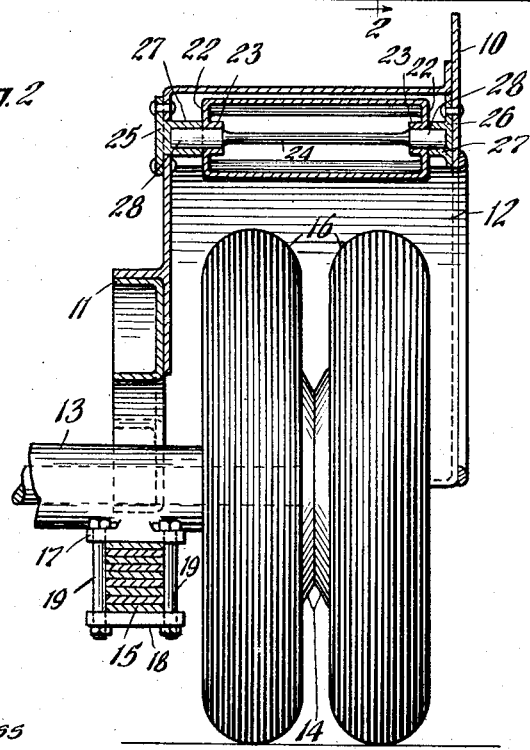

In the drawing, forming a part of this specification, Figure 1 is a side elevational view of a portion of a vehicle chassis and body showing my improvements in connection therewith. And Figure 2 is a vertical, sectional view corresponding substantially to the line 2—2 of Figure 1, the vehicle wheels being shown in elevation.

In said drawing, 10 denotes a portion of the vehicle body, 11 one of the side members or beams of the chassis, 12 the fender or wheel guard, 13 the axle housing, 14 the usual twin arranged disk wheels, and 15 one of the usual vehicle springs.

In the present instance, my improvements are shown in connection with a motor bus of the heavier type, in which the twin arranged rear wheels are disposed inwardly of the body of the vehicle, the guard or fender 12 being of usual construction and being disposed directly beneath one of the seats of the bus. As illustrated, both of the disk wheels of each twin set are provided with the usual pneumatic tires 16—16. The axle housing 13 which supports the wheels is in turn connected to the leaf springs 15 by the usual clamping elements comprising an enlargement 17 on the axle housing and a plate 18 disposed below the leaf springs, the plates being held together by the usual bolts 19. As most clearly shown in Figure 1, the guard or fender 12 is curved to conform to the circular outline of the vehicle wheels. The springs 15 are supported in the usual manner at the opposite ends thereof.

My improved shock absorber proper is in the form of a hollow roller 20 mounted in a pocket 21 at the upper side of the fender 12 immediately above the wheels 14. The roller 20 is preferably made of metal and is in the form of a hollow cylinder of a length equal to or exceeding the overall width of the twin vehicle wheels. The cylindrical roller 20 is provided with end walls 22 having inwardly extending bosses 23 forming bearings on which the roller is supported.

A shaft 24 supported on brackets 25 and 26, secured respectively to the inner side wall of the fender 12 and the outer side wall of the body of the vehicle. Each of the brackets 25 and 26 comprises a plate-like base section and a centrally disposed hollow boss 27. The bosses 27 are adapted to receive enlarged cylindrical portions 28—28 on the opposite ends of the shaft 24. As shown in Figure 2, the cylindrical portions 28 of the shaft protrude inwardly beyond the bosses 27 and co-operate with the bearing sections of the bosses 23 on the roller 20. It will thus be evident that the roller 20 is thus freely rotatably supported on the shaft 24. As most clearly shown in Figure 1, the roller 20 has the cylindrical wall thereof fluted or corrugated longitudinally to give the same increased strength. The two brackets 25 and 26 may be secured to the fender and side wall of the vehicle respectively in any suitable manner, the same being herein illustrated as riveted to these parts. As most clearly shown in Figure 2, the flange of the bracket 25 is disposed on the inner side of the vertical wall of the fender and the flange of the bracket 26 is disposed on the inner side of the side wall of the vehicle.

The roller 20 is spaced such a distance from the top of the wheels 14 that the same will be brought into contact with the pneumatic tires 16 when the vehicle spring 15 has been flexed to a predetermined extent, thereby transmitting the blow to the pneumatic tires which thus absorb the heavier shocks.

From the preceding description taken in connection with the drawings, it will be evident that by means of the roller disposed above the pneumatic tires of the vehicle wheels, an exceedingly simple and efficient shock absorber is provided, absorbing the heavier shocks without adding materially to the equipment of the vehicle. This is of special advantage in connection with motor busses where the question of available space occupied is of importance.

While I have herein shown what I now consider the preferred manner of carrying out my invention, the same is merely illustrative, and I contemplate all changes and modifications that come within the scope of the claims appended hereto.

I claim:

1. In a shock absorbing mechanism for vehicles having the wheels thereof provided with pneumatic tires, the combination with the usual vehicle springs for supporting the vehicle body; of means operative after the springs have been flexed to a predetermined extent to absorb heavy shocks, said means including abutment elements rigidly connected to the vehicle body normally spaced from said pneumatic tires a predetermined distance such that the same is adapted to engage the tires after relative movement of the wheels and body toward each other and flexing of the springs to said predetermined extent and yieldingly support the vehicle body upon said tires in conjunction with said springs.

2. In a shock absorbing mechanism for vehicles having wheels provided with resilient tires, the combination with springs for supporting the vehicle body; of a roller mounted above one of the wheels of the vehicle on a support rigid with respect to the vehicle and normally spaced a predetermined distance from the pneumatic tire thereof, so that said roller engages the tire to yieldingly support the vehicle when the vehicle springs have been flexed to said predetermined extent.

3. In a shock absorber for vehicles having wheels provided with pneumatic tires, the combination with springs for supporting the vehicle body; of a roller mounted on a support rigid with the vehicle frame and body above one of the vehicle wheels, said roller being normally spaced from the pneumatic tire thereof, to an extent to permit the roller to be engaged by the tire when the vehicle springs have been flexed to a predetermined extent to yieldingly support the vehicle body on said tire to absorb the heavier shocks.

4. In a shock absorber for vehicles having the wheels thereof provided with resilient tires, the combination with springs for supporting the body of the vehicle; of hollow corrugated rollers rotatably mounted on a support fixed to the vehicle body, said rollers co-operating with the resilient tires of said wheels and normally spaced therefrom a distance to engage said tires to compress the same after the vehicle springs have been partly flexed to absorb the heavier shocks.

In witness that I claim the foregoing I have hereunto subscribed my name this 12th day of August, 1926.

JOHN F. O'CONNOR.